(12) United States Patent
Malhotra et al.

(10) Patent No.: US 10,409,769 B1
(45) Date of Patent: Sep. 10, 2019

(54) DATA ARCHIVING IN DATA STORAGE SYSTEM ENVIRONMENTS

(71) Applicant: EMC Corporation, Hopkinton, MA (US)

(72) Inventors: Sumeet K. Malhotra, Bangalore (IN); Suresh Krishnappa, Bangalore (IN); Karthikeyan Srinivasan, Bangalore (IN); Uday Gupta, Westford, MA (US); Sairam Iyer, Coimbatore (IN)

(73) Assignee: EMC IP Holding Company LLC, Hopkintin, MA (US)

( * ) Notice: Subject to any disclaimer, the term of this patent is extended or adjusted under 35 U.S.C. 154(b) by 1043 days.

(21) Appl. No.: 14/500,032

(22) Filed: Sep. 29, 2014

(51) Int. Cl.
*G06F 16/11* (2019.01)
(52) U.S. Cl.
CPC .................................. *G06F 16/113* (2019.01)
(58) Field of Classification Search
USPC ........................................................ 707/610
See application file for complete search history.

(56) References Cited

U.S. PATENT DOCUMENTS

| | | | |
|---|---|---|---|
| 2004/0024921 A1* | 2/2004 | Peake, Jr. ............ | G06F 11/3485 710/1 |
| 2011/0099351 A1* | 4/2011 | Condict ................ | G06F 3/0608 711/216 |
| 2011/0196900 A1* | 8/2011 | Drobychev ....... | G06F 17/30575 707/812 |
| 2013/0145105 A1* | 6/2013 | Sawicki et al. ................ | 711/147 |
| 2013/0290648 A1* | 10/2013 | Shao ....................... | G06F 12/04 711/154 |
| 2014/0052706 A1* | 2/2014 | Misra ................ | G06F 17/30194 707/698 |

* cited by examiner

*Primary Examiner* — Muluemebet Gurmu
(74) *Attorney, Agent, or Firm* — Ryan, Mason & Lewis, LLP

(57) ABSTRACT

A set of data chunks stored in a first data storage system is accessed. The set of data chunks includes original data chunks and replicated data chunks respectively corresponding to the original data chunks. A given original data chunk and the corresponding replicated data chunk are stored in separate storage nodes of the first data storage system. For each of at least a subset of storage nodes of the first data storage system, unique ones of the original data chunks and the replicated data chunks stored on the storage node are aggregated to form a data object. The data objects thereby formed collectively represent a given data volume. Each of the data objects is stored in separate storage nodes of a second data storage system.

18 Claims, 11 Drawing Sheets

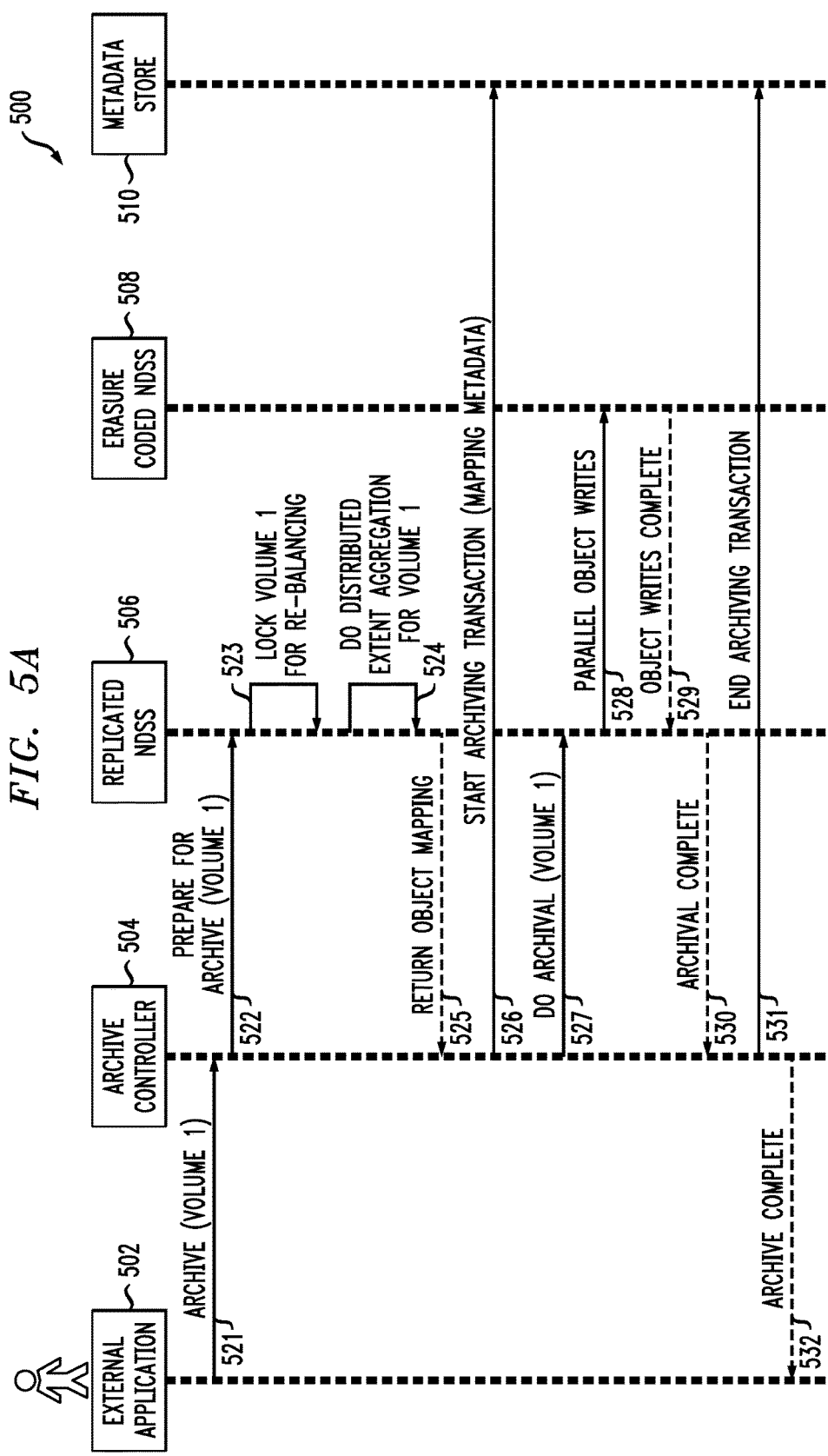

US 10,409,769 B1

DATA ARCHIVING IN DATA STORAGE SYSTEM ENVIRONMENTS

FIELD

The field relates generally to data storage system environments, and more particularly to techniques for improved data archiving in data storage system environments such as, for example, networked distributed storage systems.

BACKGROUND

Data archiving is the process of identifying and moving inactive data out of current production storage systems and into long-term archival storage systems. Moving inactive data out of production storage systems optimizes the performance of resources needed there while archival systems store information more cost-effectively and provide for retrieval when needed.

Networked distributed storage systems (NDSS) are data storage systems that can be used for data archiving as well as various other storage functions. NDSS are designed as a cluster of multiple interconnected storage nodes that are pooled together, and where more such nodes can be added as and when the demand for storage resources grows. The nodes are often constructed from commodity hardware. They provide typical storage access to client applications via any one or more of block, file or object access protocols. Internally, data is divided into multiple chunks that are dispersed throughout the cluster. As compared to traditional storage architectures, NDSS constructed from commodity hardware offer reliable storage at lower cost.

SUMMARY

Embodiments of the invention provide techniques for improved data archiving in data storage system environments such as, for example, networked distributed storage systems.

For example, in one embodiment, a method comprises the following steps. A set of data chunks stored in a first data storage system is accessed. The set of data chunks comprises original data chunks and replicated data chunks respectively corresponding to the original data chunks. A given original data chunk and the corresponding replicated data chunk are stored in separate storage nodes of the first data storage system. For each of at least a subset of storage nodes of the first data storage system, unique ones of the original data chunks and the replicated data chunks stored on the storage node are aggregated to form a data object. The data objects thereby formed collectively represent a given data volume. Each of the data objects is stored in separate storage nodes of a second data storage system.

In another embodiment, a method comprises the following steps. At least one data extent stored in a block data storage system that is accessed relatively infrequently as compared to other data extents stored in the block data storage system is identified. The identified data extent is mapped into a data object. The data object is stored in an object data storage system. The block data storage system represents a primary storage tier and the object data storage system represents a secondary storage tier.

In yet another embodiment, an article of manufacture is provided which comprises a processor-readable storage medium having encoded therein executable code of one or more software programs. The one or more software programs when executed by the at least one processing device implement steps of one or more of the above-described method.

In a further embodiment, an apparatus comprises a memory and a processor configured to perform steps of one or more of the above-described method.

Advantageously, illustrative embodiments described herein provide fast and optimized data archiving techniques in data storage environments including, but not limited to, those employing commodity hardware to build highly scalable NDSS.

These and other features and advantages of the present invention will become more readily apparent from the accompanying drawings and the following detailed description.

BRIEF DESCRIPTION OF THE DRAWINGS

FIG. 5A shows a write path methodology according to an embodiment of the invention.

DETAILED DESCRIPTION

Figure 1:
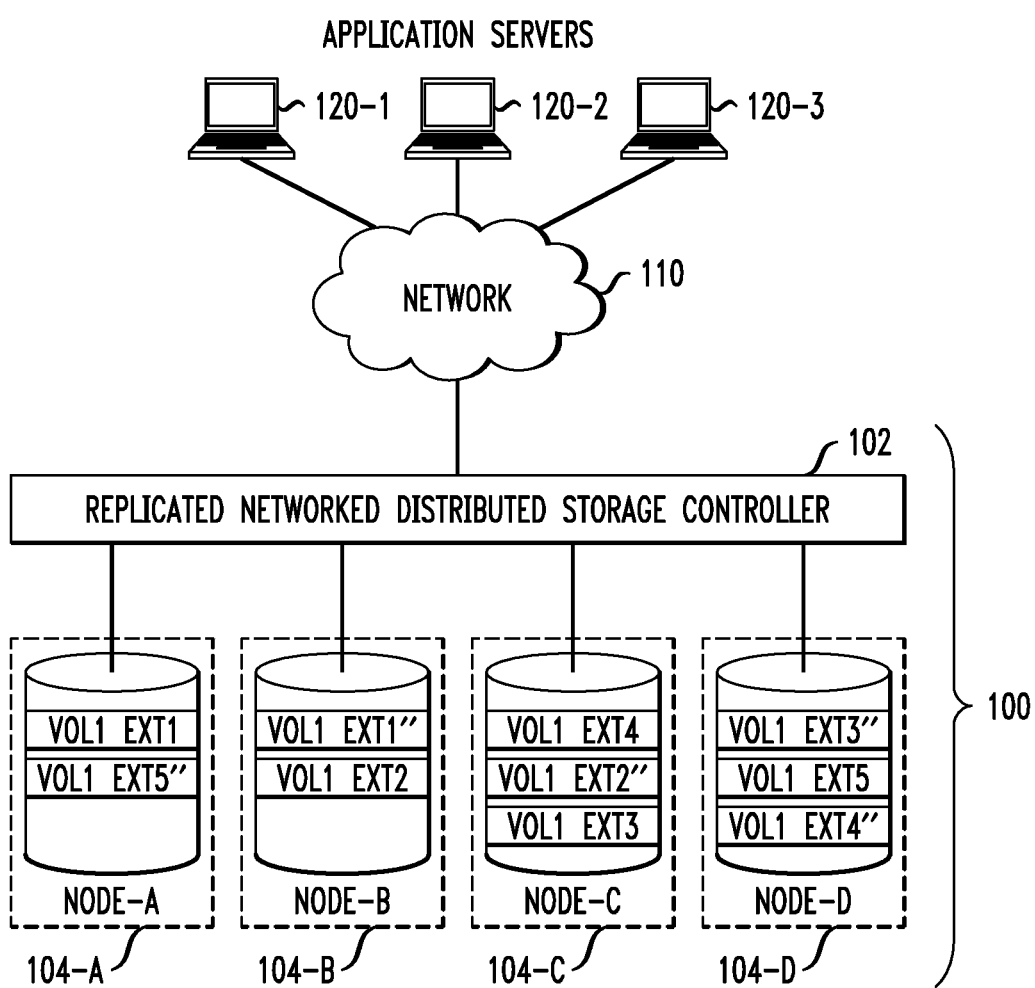
FIG. 1 shows a replicated NDSS according to an embodiment of the invention.

Embodiments of the invention will be described herein with reference to exemplary computing systems, data storage systems, servers, computers, memory devices, storage devices and other processing devices. It is to be appreciated, however, that embodiments of the invention are not restricted to use with the particular illustrative system and device configurations shown. Moreover, the phrases "computing system," "processing platform," "data storage system," and "data storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. However, a given embodiment may more generally comprise any arrangement of one or more processing devices.

A block device/volume is an abstraction of the hardware responsible for storing and retrieving specified blocks of data. A system providing storage to one or more applications as block devices or volumes is called a block storage system. Examples of block storage systems are VMAX, VNX Block and ScaleIO (each commercially available from EMC Corporation, Hopkinton Mass.). Block storage presents itself using industry standard connectivity mechanisms such as, by way of example, Fibre Channel and Internet Small Computer System Interface (iSCSI).

Object storage, also known as object-based storage, is a storage architecture that manages data as objects, as opposed to other storage architectures such as, by way of example, block storage. Each object typically includes the data itself, a variable amount of metadata, and a globally unique identifier called the Object ID. Examples of object storage systems are Atmos and ViPR (each commercially available from EMC Corporation, Hopkinton Mass.). Object storage is also the most common storage abstraction offered by many public cloud vendors.

As mentioned above, NDSS are designed as a cluster of multiple interconnected storage nodes that are pooled together, and where more such nodes can be added as and when the demand for storage resources grows and where nodes are often constructed from commodity hardware. They provide typical storage access to client applications via any one or more of block, file or object access protocols, and (internal to the NDSS) data is divided into multiple chunks that are dispersed throughout the cluster. NDSS constructed from commodity hardware offer reliable storage at lower cost. NDSS come in many forms such as, by way of example, public cloud services, data centers and peer-to-peer (P2P) storage/backup systems. Examples of Networked Distributed Storage Systems are ViPR and ScaleIO (each commercially available from EMC Corporation, Hopkinton Mass.).

Dispersed object stores, or simply dispersed storage, are designed as a cluster comprising multiple processing nodes that are typically commodity hardware. They provide typical object access to applications. Internally, data is divided into multiple chunks that are dispersed throughout the cluster. Data reliability is achieved either by replicating data chunks across multiple cluster nodes or using a software protection technique called erasure coding. As compared to traditional storage architectures, dispersed object stores constructed from commodity hardware offer reliable storage at lower cost.

Erasure coding is a method of data protection in which data is broken into fragments, expanded and encoded with redundant data pieces and stored across a set of different locations, such as disks, storage nodes or geographic locations. Erasure coding creates a mathematical function to describe a set of numbers so they can be checked for accuracy and recovered if one is lost. Referred to as polynomial interpolation or oversampling, this is the key concept behind erasure codes. When used in dispersed object storage, erasure coding provides data reliability by allowing the data to be reliably recovered in the event of multiple node failures. As compared to data protection by replication, erasure coding achieves the same reliability at a lower storage footprint.

Storage tiering is a storage management technique where frequently accessed data is kept on high performing storage such as, by way of example, Flash or Fibre Channel drives whereas infrequently accessed data can be moved to low performing storage such as, by way of example, Serial Advance Technology Attachment (SATA) devices. This provides an overall optimal usage of the various storage tiers in the storage system. Storage tiering can be performed at a block device level or at a sub device level.

Using commodity hardware to build highly scalable NDSS makes node failures fairly common thereby causing potential data loss. Data reliability in NDSS is achieved either by replicating data chunks across multiple cluster nodes or using a software protection technique such as, by way of example, erasure coding.

By replicating data chunks across multiple cluster nodes, any single point of failure is eliminated. Replication offers faster data protection as multiple copies of the data chunk can be made in parallel. Systems typically follow two-times (2×) or three-times (3×) replication. When a cluster node fails, the storage system may initiate a re-balancing sequence that creates new replicas for all the affected data chunks.

Replication offers quick data protection but has certain drawbacks. First, replication consumes storage space. Depending upon the replication factor (2× or 3×), that much more storage space is consumed in order to keep data reliably stored. Second, replication cannot handle multiple node failures. If more than replication factor nodes fail, the system may not be able to recover full data.

As mentioned above, erasure coding is a method of data protection in which data is broken into fragments, expanded and encoded with redundant data pieces and stored across a set of different locations, such as disks, storage nodes or geographic locations. In mathematical terms, the protection offered by erasure coding can be represented in simple form by the following equation: $n=k+m$. The variable "k" is the original amount of data or symbols. The variable "m" stands for the extra or redundant symbols that are added to provide protection from failures. The variable "n" is the total number of symbols created after the erasure coding process.

Erasure coding provides data reliability by allowing the data to be reliably recovered in event of multiple node failures. As compared to data protection by replication, erasure coding achieves the same reliability at a lower storage footprint. Typical storage overheads are in the range of 1.3× to 1.5×. But this comes at a cost of extra computational overhead in the input/output (I/O) path. Erasure coded storage systems are typically ideal for long term archiving of data where the space efficiency gains outweigh the performance overhead. An example of a storage system using erasure coding for protection is Isilon (commercially available from EMC Corporation, Hopkinton Mass.).

For long term protection and archiving of data, erasure coded object storage systems have been used in conjunction with replicated systems. When the data is written into the system, it is immediately replicated to provide near term protection. Later on, the data is typically migrated to an erasure coded storage system in order to free up replicated space.

In conventional approaches, archiving from replicated NDSS to an erasure coded NDSS involves the following steps:
1. Erasure code a data chunk.
2. Disperse the erasure coded chunk fragments in the erasure code storage system.
3. Free up the replicated storage, including the 2× or 3× replicas.

This approach is sequential in nature and does not factor in at least two important aspects of replicated storage systems:

Each data chunk in the replicated NDSS is available on multiple cluster nodes. It is available on two nodes in case of 2× replication factor and on three nodes in case of 3× replication.

Due to mesh replication techniques followed by most replicated NDSS, each node actually has more than one data chunk available on it—either the original or a replicated chunk.

Illustrative embodiments provide a fast and optimized approach to archiving data from replicated NDSS to an erasure coded NDSS by taking advantage of the replicated nature and local aggregation of replicated data chunks. Furthermore, the fast and optimized archival approach is extended into a more generic storage tiering methodology by creating a method of utilizing dispersed object stores as a secondary storage tier to primary enterprise block storage, where the enterprise block storage can be any extent based storage system including, but not limited to, arrays, host based volume managers, or converged systems.

In one illustrative embodiment, smart aggregation of co-located data chunks is performed. A generalized replicated NDSS is represented as depicted in FIG. 1. The replicated NDSS 100 in FIG. 1 is an example of a replicated NDSS which includes a controller 102 and four nodes 104-A through 104-D (Node-A, Node-B, Node-C and Node-D). It is assumed that the replicated NDSS exports one volume (Vol1) to application servers 120-1 through 120-3 via network 110 (although more than one volume may be exported). A volume is subdivided into data chunks called "extents." Assuming a replication factor of 2×, this results in the extents being replicated on two nodes (e.g., original extent Vol1 Ext1 is stored on Node-A while corresponding replicated extent Vol1 Ext1" is stored on Node-B). FIG. 1 shows a representative view of how an example extent distribution might look.

Figure 2:
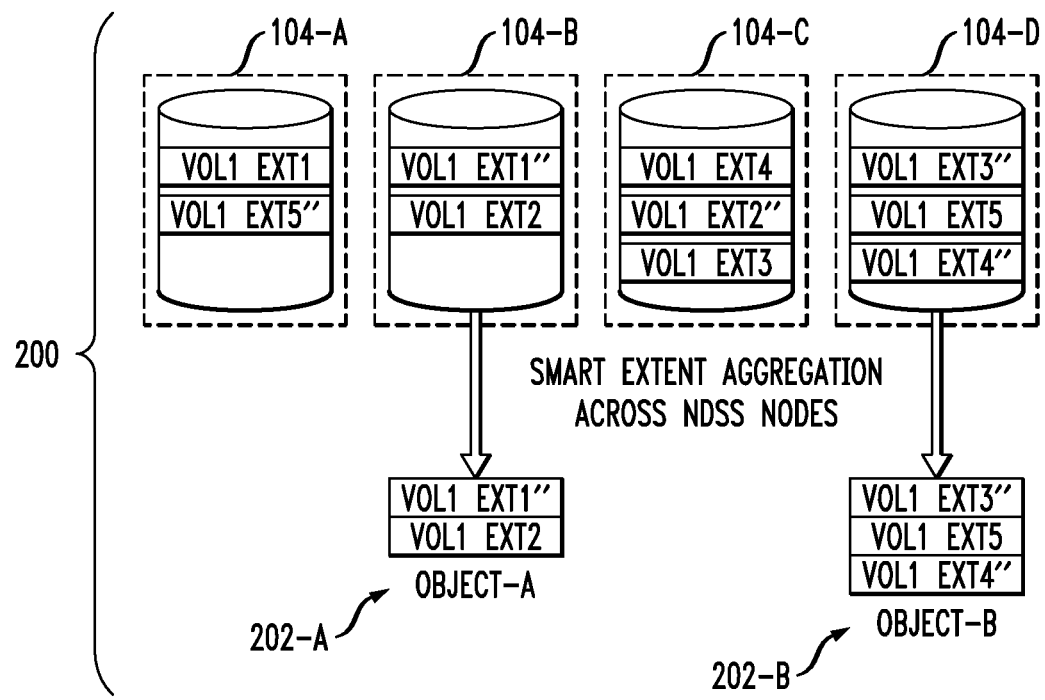
FIG. 2 shows data chunk aggregation in a replicated NDSS according to an embodiment of the invention.

In order to archive a volume, e.g., Vol1, the illustrative embodiment takes advantage of the fact that its extents are distributed across multiple nodes, which results in more than one unique extent being co-located on the same NDSS node. Aggregating these co-located chunks in parallel results in data blobs or data objects representing the entire volume. As shown in NDSS 200 in FIG. 2, object 202-A (Object-A) includes replicated extent 1 and original extent 2, while object 202-B (Object-B) includes replicated extent 3, original extent 5, and replicated extent 4. The resulting data objects represent the archival data (i.e., entire Vol1), but not necessarily in the correct sequential order of extents.

Figure 3:
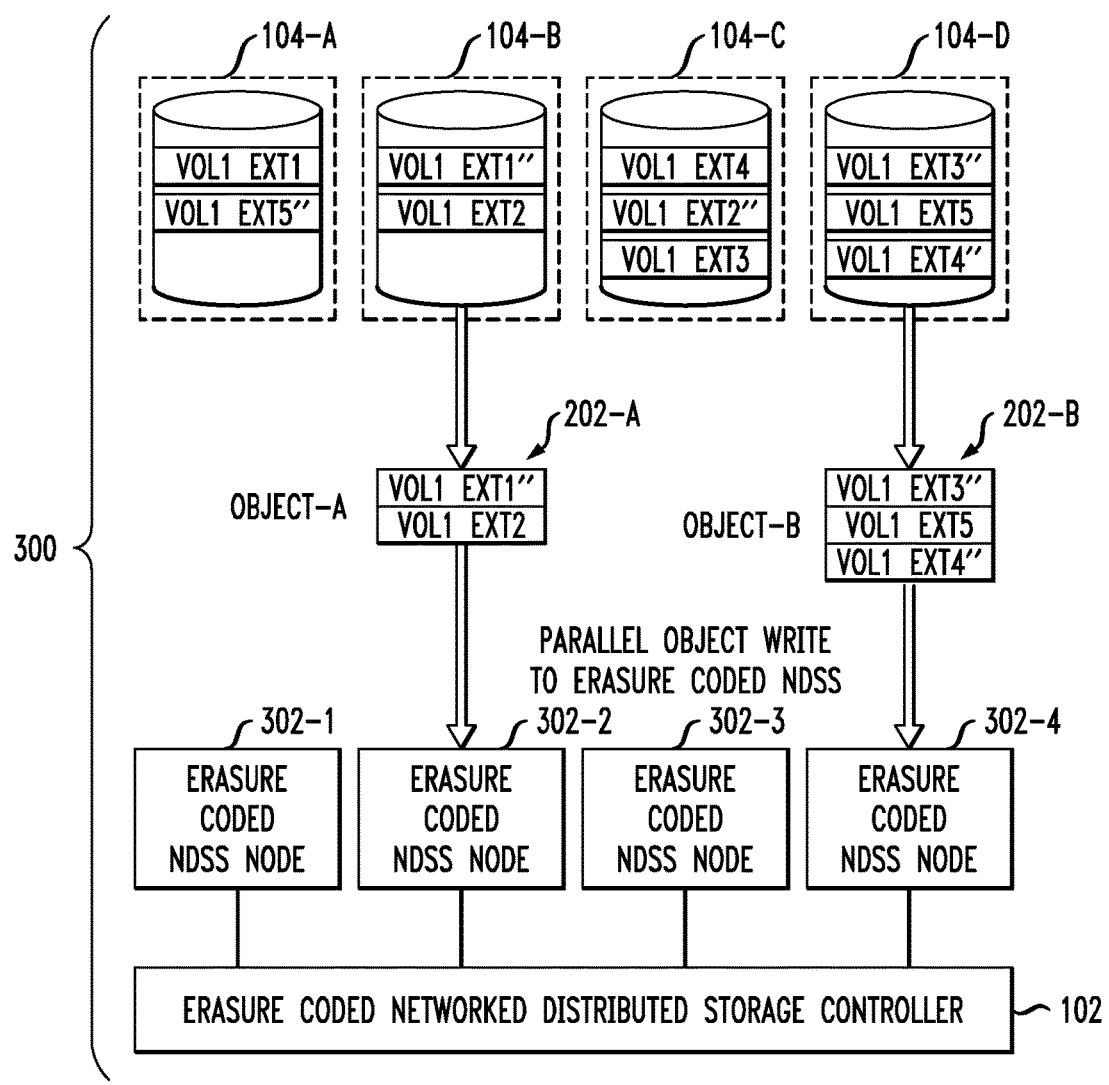
FIG. 3 shows a parallel object write methodology according to an embodiment of the invention.

FIG. 3 illustrates a parallel object write to an erasure coded storage system 300 according to an illustrative embodiment of the invention. In order to achieve fast archiving, the aggregated blob or objects 202-A and 202-B are treated as independent objects and written in parallel to the underlying erasure coded NDSS nodes 302-1 through 302-4 as shown.

There are two key aspects of aggregating extents and writing them as an independent data object to an erasure coded NDSS:
1. the extents inside the object may be out of order; and
2. the extents making up the volume are spread in multiple objects.

Figure 4:
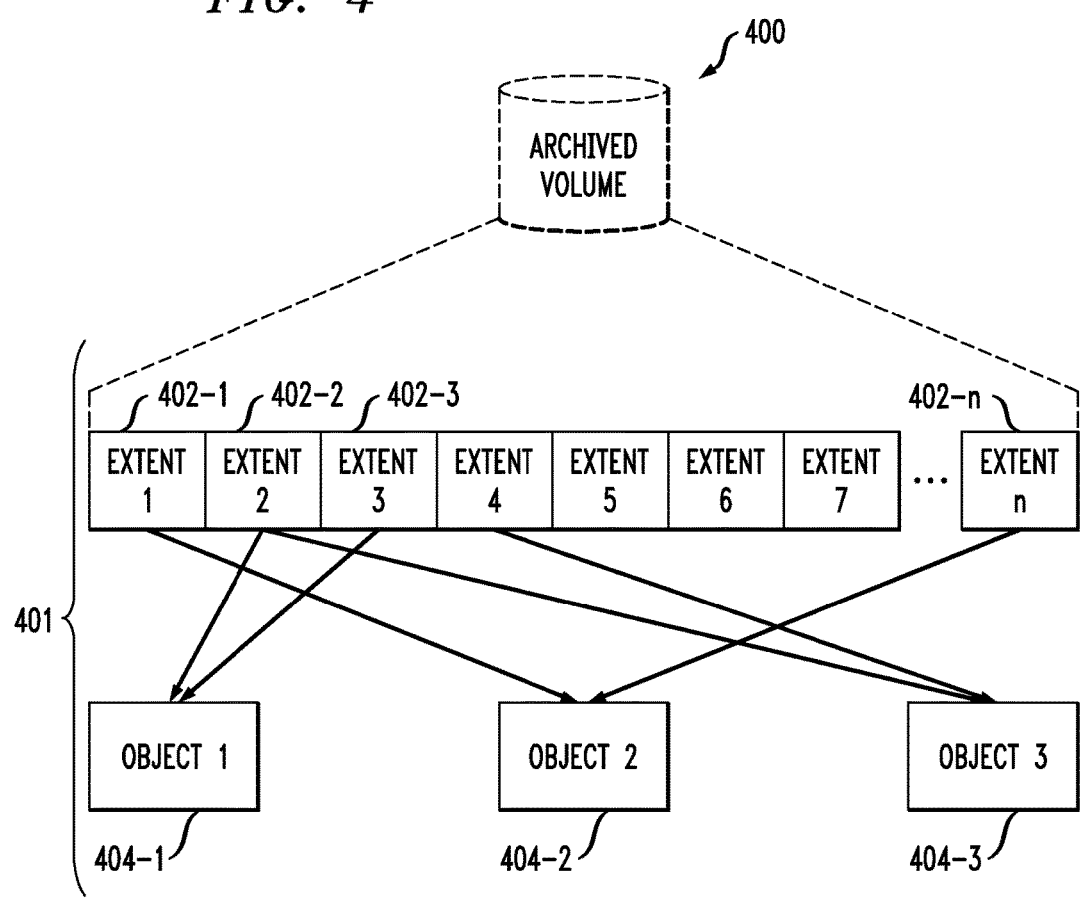
FIG. 4 shows a methodology for metadata mapping of an original volume to one or more objects according to an embodiment of the invention.

To address these aspects, another key feature of this technique is to maintain a metadata mapping of the original volume to the objects to which it is mapped, as illustratively shown in FIG. 4. In an illustrative embodiment, metadata mapping may be done as follows. For each extent (402-1, 402-2, 402-3, . . . , 402-n) in the original volume, the following metadata mapping 401 is maintained:

extent==>{Object ID, Offset, Length} where the objects, by way of example only, are objects 404-1 (e.g., includes extents 2 and 3), 404-2 (e.g., includes extents 1 and n), and 404-3 (includes extents 2 and 4). Note that Object ID parameter is a unique identifier of a given object. The Offset parameter is the relative position in the object to where the given extent is mapped. The Length parameter is the length of the data from the offset representing the extent.

This allows a "read from archive" operation to first map the volume to the corresponding object, and then re-assemble the archived volume 400 in the correct order.

FIG. 5A depicts a write path methodology 500 which archives a volume, according to an illustrative embodiment. As shown in FIG. 5A, a system environment in which methodology 500 is implemented comprises an external application 502, an archive controller 504, a replicated NDSS 506, an erasure coded NDSS 508, and a metadata store 510. The system environment may comprise one or more additional components than those that are shown. It is understood that the components of the system environment are in communication with one another and can exchange data and/or messages, as needed, via one or more communication protocols.

As shown in the methodology 500, in step 521, external application 502 (which may be, for example, any type of function-specific software program(s) that utilizes storage resources in the system environment) sends a message to archive controller 504 that it wishes to archive a volume, e.g., in this case, Volume 1. Archive controller 504 sends a message, in step 522, to replicated NDSS 506 to instruct the replicated NDSS to prepare for archiving Volume 1. Replicated NDSS 506 locks Volume 1 for rebalancing, in step 523. In step 524, replicated NDSS 506 performs distributed extent aggregation (as explained above) for Volume 1. In step 525, replicated NDSS 506 returns the object mapping (e.g., 401 in FIG. 4) to archive controller 504.

Archive controller 504, in step 526, then starts the archiving transaction (mapping metadata) with metadata store 510, and instructs replicated NDSS 506 in step 527 to perform archiving of Volume 1. In step 528, replicated NDSS 506 performs parallel object writes to erasure coded NDSS 508. Erasure coded NDSS 508 responds in step 529 with an object write complete message once writes are completed. In step 530, replicated NDSS 506 sends an archiving complete message to archive controller 504. Archive controller 504 sends an end archiving transaction message to metadata store 510, in step 531, and an archive complete message to external application 502, in step 532.

Figure 5B:
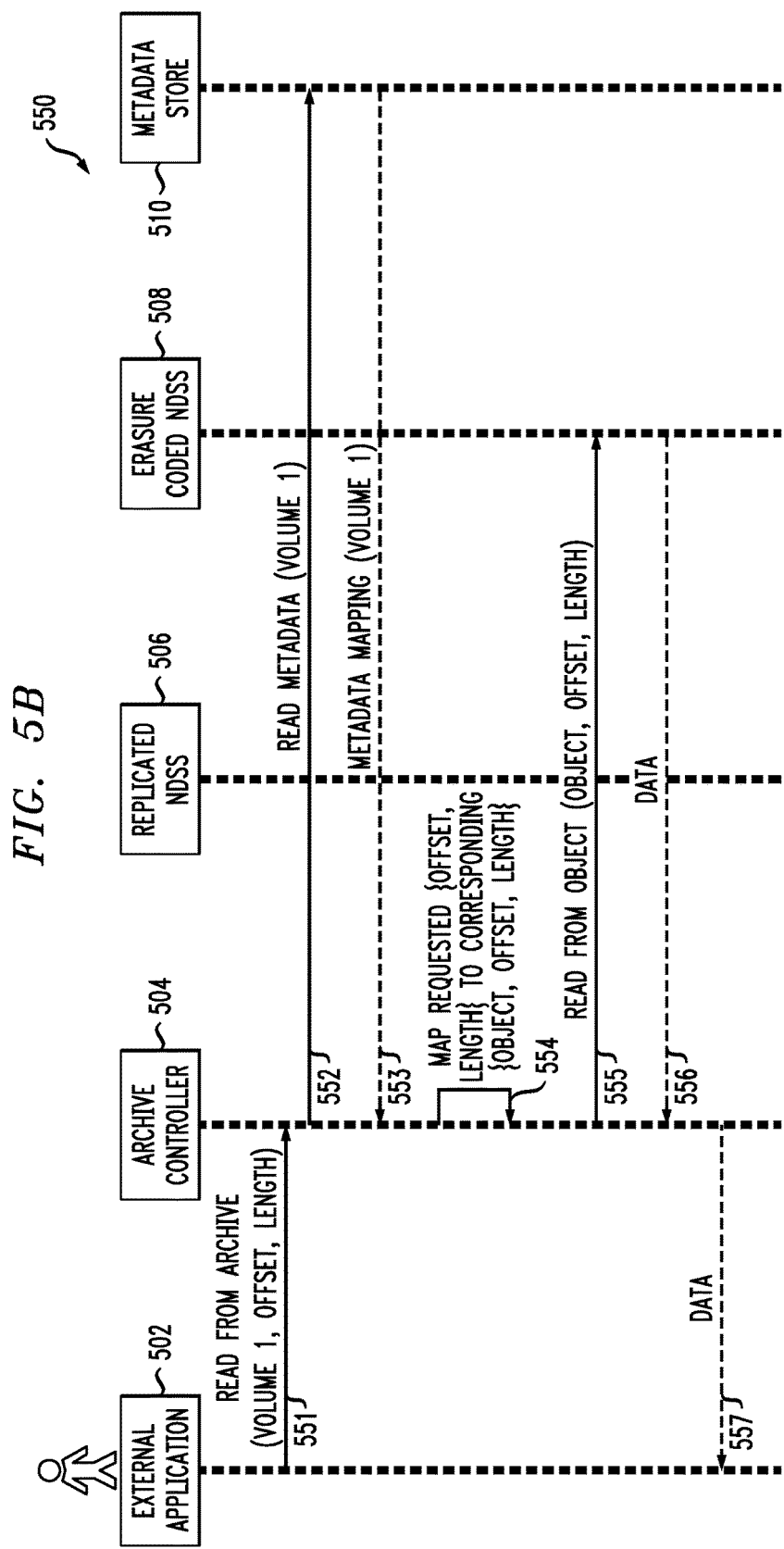
FIG. 5B shows a read path methodology according to an embodiment of the invention.

FIG. 5B depicts a read path methodology 550 which reads from a volume, according to an illustrative embodiment. As is evident, the same components in the system environment referenced above for an archive write in FIG. 5A are referenced here for an archive read in FIG. 5B.

As shown in the methodology 550, in step 551, external application 502 sends a read from archive instruction to archive controller 504 that includes a tuple (Volume ID, Offset, Length), wherein it is assumed here that the volume to be read is Volume 1. In step 552, archive controller 504 rends a read metadata for Volume 1 instruction to metadata store 510. In response, metadata store 510 provides the metadata mapping for Volume 1 to archive controller 504, in step 553. Archive controller 504 maps the requested (Offset, Length) to corresponding (Object ID, Offset, Length), in step 554. In step 555, archive controller 504 sends a read from object (Object ID, Offset, Length) instruction to erasure coded NDSS 508. Erasure coded NDSS 508 returns the requested data to archive controller 504, in step 556, which then provides the requested data to external application 502, in step 557.

Furthermore, illustrative embodiments of the invention provide for using dispersed object storage as a secondary tier for primary enterprise block storage. That is, extending the above-mentioned fast data archival methodologies, illustrative embodiments use object storage as a secondary tier to primary block storage as will now be described. Such tiering methodologies may be applied in conjunction with replicated and erasure coded NDSS, or other types of data storage systems.

Figure 6:
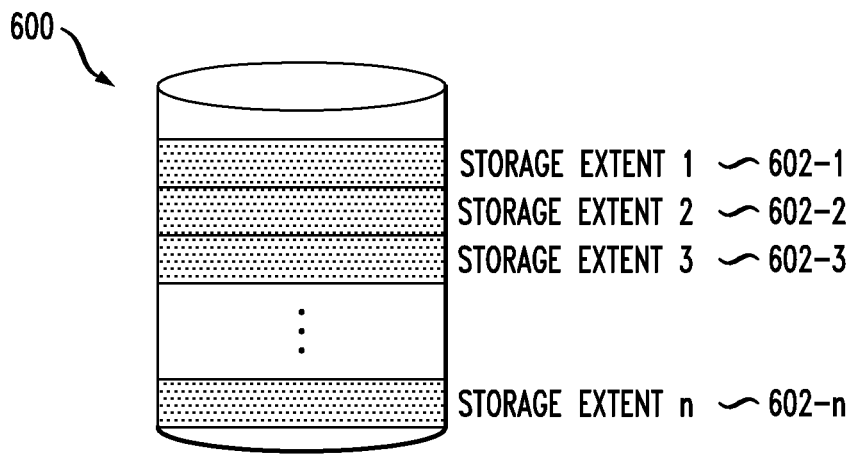
FIG. 6 shows a block storage volume according to an embodiment of the invention.

FIG. 6 represents an illustrative block storage volume/device 600. A volume of size S is internally divided into equal-sized logical storage extents 602-1, 602-2, 602-3, . . . , 602-n. An extent represents a contiguous region of the address space of the block volume. The number, and hence the size, of the storage extents is configurable.

Figure 7:
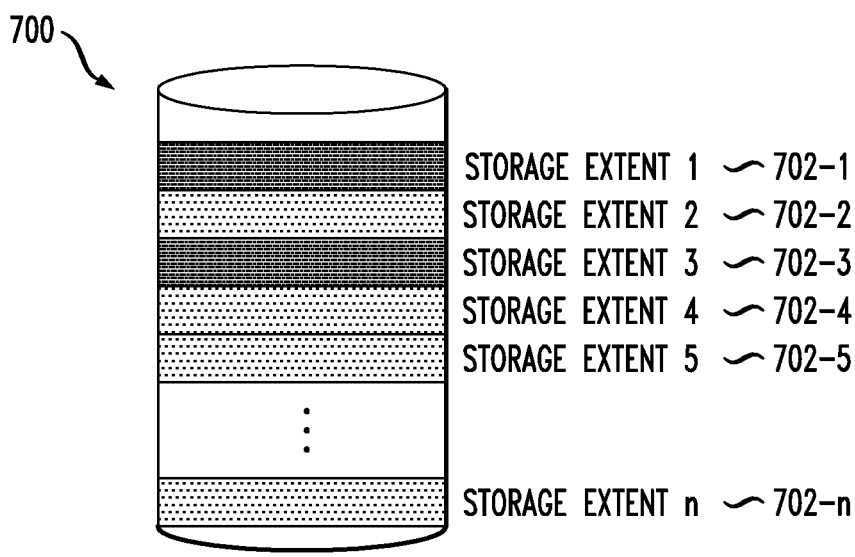
FIG. 7 shows hot and cold data storage regions in a block storage volume according to an embodiment of the invention.

In a typical block volume, the input/output (I/O) patterns are not always uniform. There are "hot regions" where most of the I/O access occurs and there are "cold regions" where low or no I/O access occurs. This typically follows an 80:20 rule: 80% of the volume is cold and only 20% of the volume is hot. Automated storage tiering techniques according to illustrative embodiments of the invention identify these hot and cold regions and move data in the cold regions to low cost storage whereas hot data regions are kept on fast and high performing storage tiers. FIG. 7 shows how some storage extents in a block volume can be hot whereas others are cold. For instance, as shown in block volume 700, storage extents 1 (702-1) and 3 (702-3) are considered hot regions, while storage extents 2 (702-2), 4 (702-4), 5 (702-5), and n (702-n) are considered cold regions.

Dispersed object storage provides all the characteristics of a low storage tier: durability of data, space efficiencies (due to erasure coding) and cost benefits (due to commodity hardware). But object storage does not understand block storage protocols.

Figure 8:
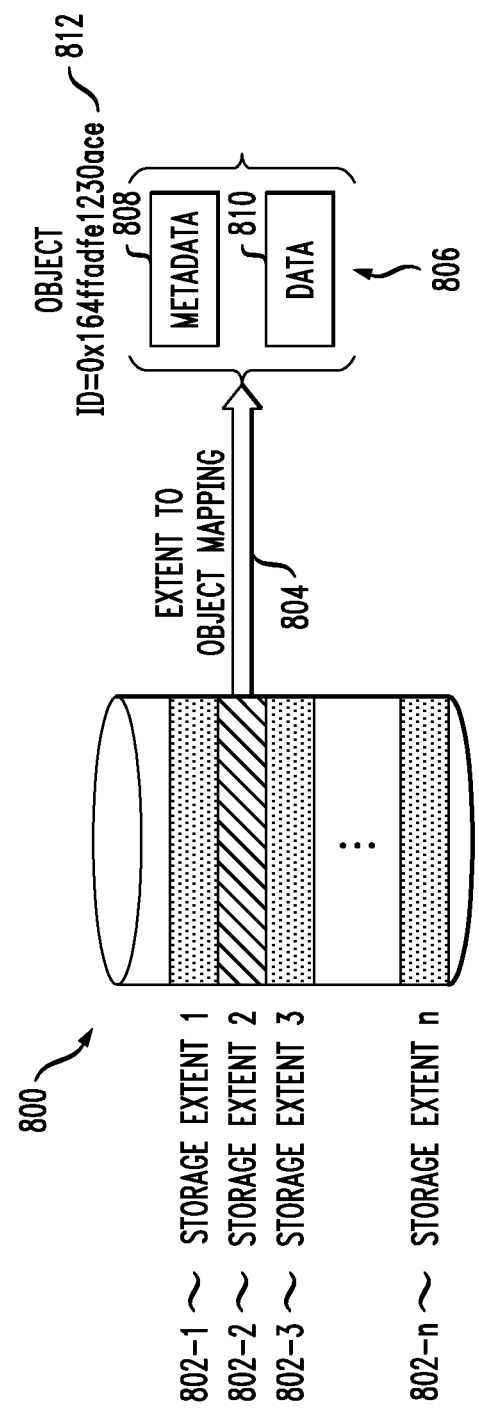
FIG. 8 shows a methodology for mapping storage extents to objects according to an embodiment of the invention.

In order to utilize a dispersed object storage system as a lower tier for enterprise storage, illustrative embodiments of the invention provide for mapping the storage extent into a corresponding object. This is illustrated in FIG. 8 with block volume 800 which includes storage extents 802-1, 802-2, 802-3, . . . , 802-n. In FIG. 8, storage extent 802-2 is used as the example for which an object 806 is created (mapped in step 804). The object's data 810 corresponds to the data in the storage extent. The metadata 808 contains the following information (parameters) about the object:

Block Volume Id: The volume from which the storage extent and object came.

Block range: This represents the storage extent's region and is represented by the start logical block address (LBA) and the length of the extent in terms of blocks.

Apart from this, each object has a unique object ID 812 that can be used to reference that object in the dispersed object storage system.

Figure 9:
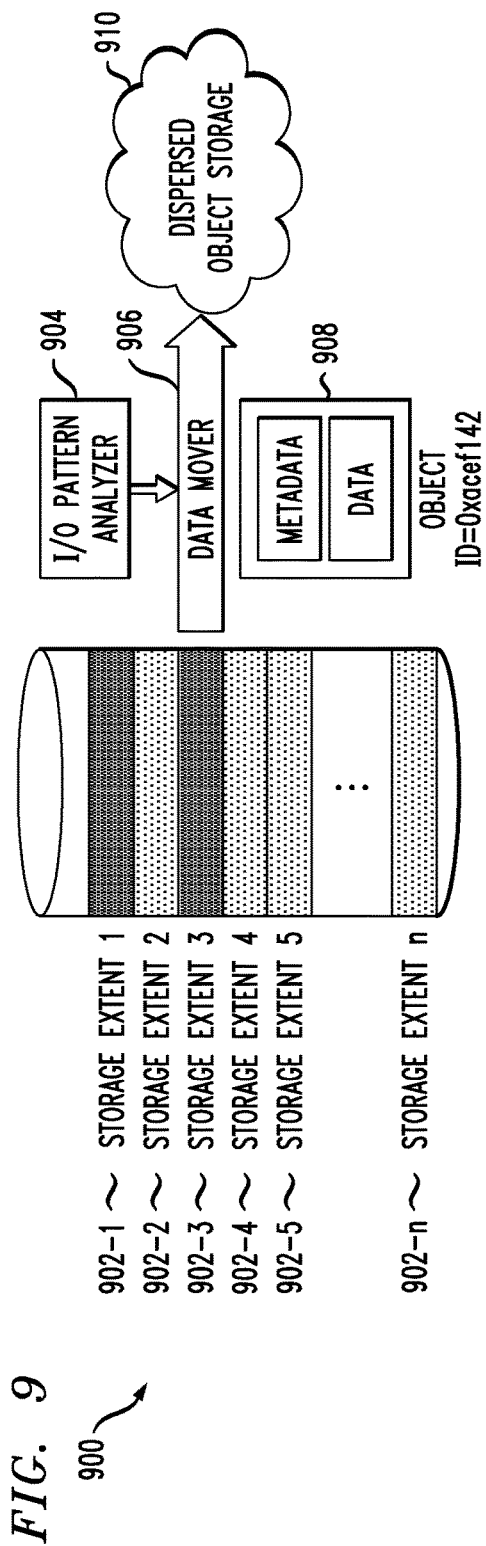
FIG. 9 shows a block to object tiering methodology according to an embodiment of the invention.

FIG. 9 illustrates a block to object tiering methodology according to an illustrative embodiment. In this example, block volume 900 includes storage extents 902-1, 902-2, 902-3, 902-4, 902-5, . . . , 902-n.

In order to use a dispersed object storage system as a secondary tier to the primary block storage system, the hot and cold storage extents are determined. Collecting and analyzing I/O statistics over a specified time window can be used to make this determination. One ordinarily skilled in the art will realize existing mechanisms of I/O statistic collection and analysis that can be used to perform this task. As illustrated in FIG. 9, a module referred to as I/O pattern analyzer 904 performs the collecting and analyzing task.

Once the hot and cold storage extents have been identified, a data mover 906 (or block to object migration component) reads the cold storage extent data and converts it into a corresponding object 908. This is done for each extent that is identified as being a cold region. The data mover 906 then writes the objects to the dispersed object storage system 910.

Figure 10:
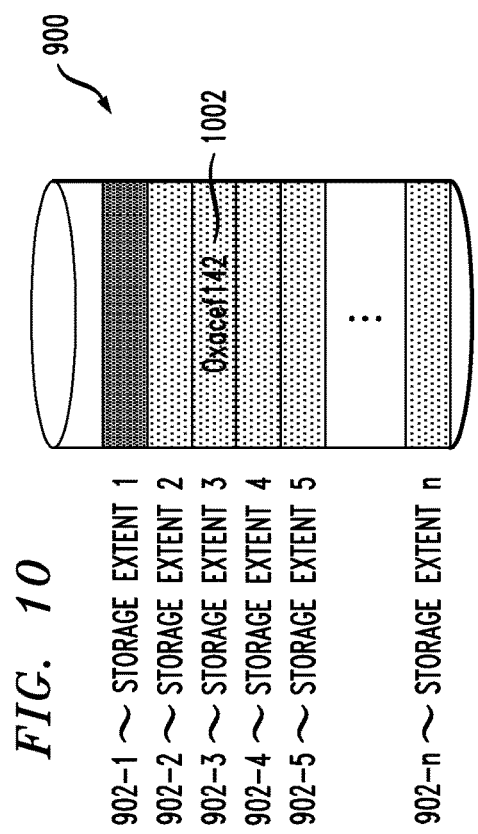
FIG. 10 shows an object reference stub in a block storage volume according to an embodiment of the invention.

As illustrated in FIG. 10, the data mover 906 then frees each tiered down storage extent, and replaces it with a special stub (reference parameter), which contains the object ID (1002) of the corresponding data object. This is achieved in pointer based volume implementations where the storage extents are actually pointers into the corresponding disk locations. In that implementation, the stub can be a location on the disk that has the persisted object ID.

Figure 11:
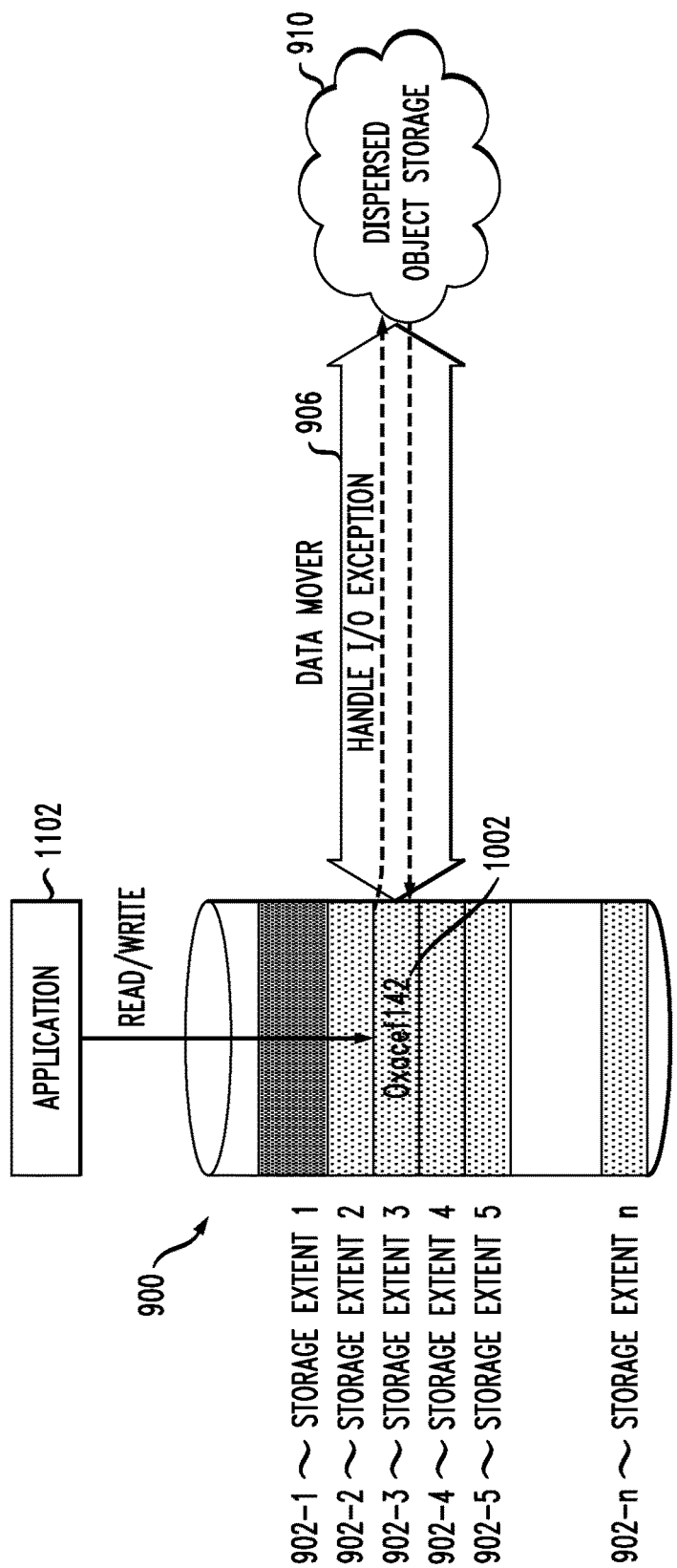
FIG. 11 shows a methodology for input/output handling in block to object tiering according to an embodiment of the invention.

Once a cold storage extent has been tiered down, it can still receive I/O from the application layer. This is illustrated in FIG. 11 with respect to application 1102. Since the cold storage extent has been replaced with the object reference stub, this results in an I/O exception. The data mover 906 handles the I/O exceptions by using the object ID 1002 from the stub and fetching that object from the dispersed object store 910.

Whether to fetch the entire object upon the first READ exception or not is policy driven and can be based upon a threshold limit. For sporadic and highly infrequent cold data READ operations, the data mover 906 does not fetch the entire object but can perform a range read on the object within the object storage system 910. After a threshold of access attempts has crossed, the data is now considered hot again and the data mover 906 reads the entire object and moves the data back into the block storage system for better READ performance.

For WRITE operations, the data mover 906 reads the entire object from the dispersed object store 910 and restores the corresponding storage extent. The WRITE can then be processed normally.

It is to be appreciated that illustrative embodiments described above can be extended in a straightforward manner given the illustrative descriptions herein. For example, the use of dispersed object storage as secondary tier to primary storage (primary-secondary tiering principle) can be used for mapping multiple storage extents to a single object. An optimization of the primary-secondary tiering principle is to pack more than one storage element in a single object. This may be done if the storage extent size is small as compared to the optimal object size. In this case, mapping multiple storage extents to a single object provides better object storage performance. Also, alternative embodiments provide for using generic object storage system, instead of dispersed object storage system. The primary-secondary tiering principle can be extended to any generic object storage system and is not limited to dispersed object storage systems. The use of dispersed object storage as secondary tier to primary storage can also be extended to tiering to a cloud infrastructure. That is, the primary-secondary tiering principle can be extended to any public or private cloud service and is not limited to dispersed object storage systems. The primary-secondary tiering principle can also be done at the volume level for archival use cases. Instead of performing storage extent level tiering, the primary-secondary tiering principle can be extended to achieve full volume level tiering by mapping a volume to an object. This provides a way to archive block level volumes to object storage.

Figure 12:
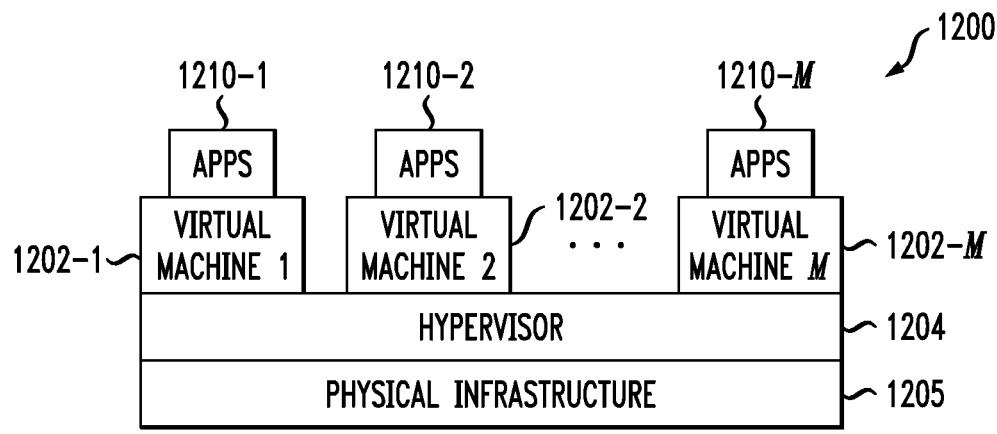
FIGS. 12 and 13 show examples of processing platforms utilized to implement a data storage system environment and one or more methodologies according to an embodiment of the invention.

It is to be appreciated that, while not limited thereto, the various components and steps illustrated and described in FIGS. 1 through 11 can be implemented in a distributed virtual infrastructure or cloud infrastructure, as mentioned above. FIG. 12 illustrates a cloud infrastructure 1200. One or more of the various data archiving and tiering methodologies described herein can be implemented, in whole or in part, by the cloud infrastructure 1200.

As shown, the cloud infrastructure 1200 comprises virtual machines (VMs) 1202-1, 1202-2, . . . , 1202-M implemented using a hypervisor 1204. The hypervisor 1204 runs on physical infrastructure 1205. The cloud infrastructure 1200 further comprises sets of applications 1210-1, 1210-2, . . . , 1210-M running on respective ones of the virtual machines 1202-1, 1202-2, . . . , 1202-M (utilizing associated logical storage units or LUNs) under the control of the hypervisor 1204.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Although only a single hypervisor 1204 is shown in the example of FIG. 12, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 1204 which, as shown in FIG. 12, is directly inserted on top of the computer hardware in order to allocate hardware resources of the physical computer (physical infrastructure 1205) dynamically and transparently. The hypervisor 1204 affords the ability for multiple operating systems to run concurrently on a single physical computer and share hardware resources with each other.

An example of a commercially available hypervisor platform that may be used to implement portions of the cloud infrastructure 1200 in one or more embodiments of the invention is vSphere which may have an associated virtual infrastructure management system such as vCenter, both commercially available from VMware Inc. of Palo Alto, Calif. The underlying physical infrastructure 1205 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 1200.

Figure 13:
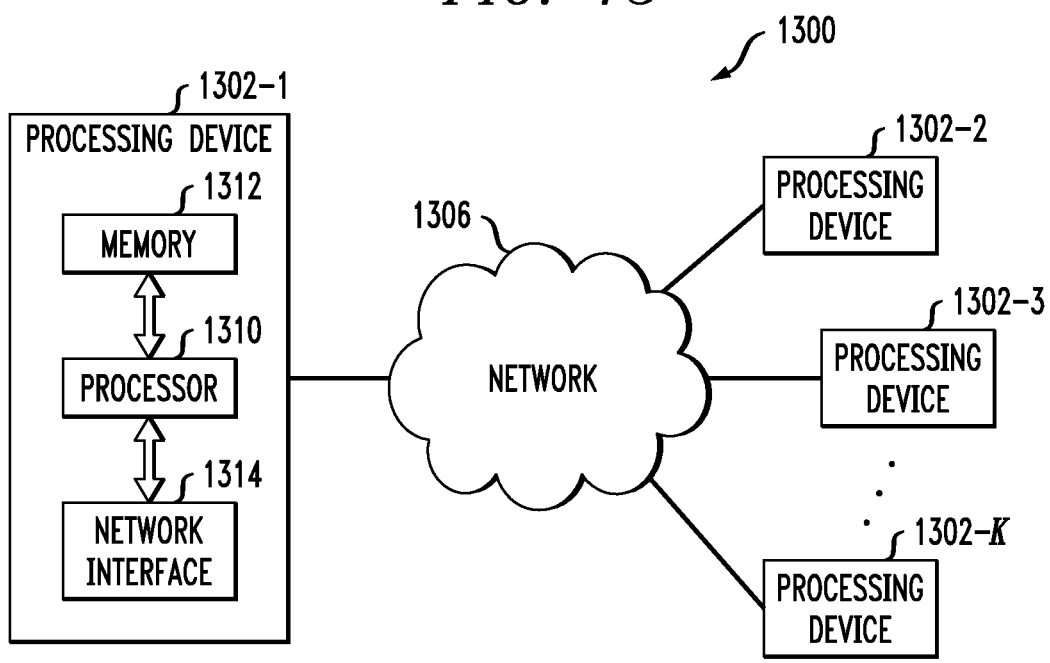

An example of a processing platform on which the cloud infrastructure 1200 (or any other platform upon which one or more data archiving and tiering methodologies described herein are realized) may be implemented is processing platform 1300 shown in FIG. 13. The processing platform 1300 in this embodiment comprises a plurality of processing devices denoted 1302-1, 1302-2, 1302-3, . . . , 1302-K which communicate with one another over a network 1306. One or more of the components shown and described in FIGS. 1 through 12 may therefore each run on one or more storage arrays, one or more hosts, servers, computers or other processing platform elements, each of which may be viewed as an example of what is more generally referred to herein as a "processing device." As illustrated in FIG. 13, such a device generally comprises at least one processor and an associated memory, and implements one or more functional modules for controlling certain features of components shown in FIGS. 1 through 12. Again, multiple elements or modules may be implemented by a single processing device in a given embodiment.

The processing device 1302-1 in the processing platform 1300 comprises a processor 1310 coupled to a memory 1312. The processor 1310 may comprise a microprocessor, a microcontroller, an application-specific integrated circuit (ASIC), a field programmable gate array (FPGA) or other type of processing circuitry, as well as portions or combinations of such circuitry elements.

The memory 1312 (or other storage devices) having program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals. Furthermore, memory 1312 may comprise electronic memory such as random access memory (RAM), read-only memory (ROM) or other types of memory, in any combination. One or more software programs (program code) when executed by a processing device such as the processing device 1302-1 causes the device to perform functions associated with one or more of the components/steps described herein. One skilled in the art would be readily able to implement such software given the teachings provided herein. Other examples of processor-readable storage media embodying embodiments of the invention may include, for example, optical or magnetic disks.

Also included in the processing device 1302-1 is network interface circuitry 1314, which is used to interface the processing device with the network 1306 and other system components. Such circuitry may comprise conventional transceivers of a type well known in the art.

The other processing devices 1302 of the processing platform 1300 are assumed to be configured in a manner similar to that shown for processing device 1302-1 in the figure.

The processing platform 1300 shown in FIG. 13 may comprise additional known components such as batch processing systems, parallel processing systems, physical machines, virtual machines, virtual switches, storage volumes, logical units, etc. Again, the particular processing platform shown in FIG. 13 is presented by way of example only, and components and steps shown and described in FIGS. 1 through 12 may include additional or alternative processing platforms, as well as numerous distinct processing platforms in any combination.

Also, numerous other arrangements of servers, computers, storage devices or other components are possible for implementing components shown and described in FIGS. 1 through 12. Such components can communicate with other components over any type of network, such as a wide area network (WAN), a local area network (LAN), a satellite network, a telephone or cable network, a storage network (e.g., Fibre Channel, iSCSI, Ethernet), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for improving data archiving within a network distributed storage system environment, comprising:
   accessing, in response to a request received from an application program, a set of data chunks stored in a first data storage system of the network distributed storage system environment, the set of data chunks comprising one or more original data chunks and one or more replicated data chunks respectively corresponding to the one or more original data chunks, wherein a given original data chunk and the corresponding replicated data chunk are stored in separate storage nodes of the first data storage system, wherein the request is received by a controller in communication with the first data storage system;
   for each of at least a subset of storage nodes of the first data storage system, aggregating two or more of the original data chunks and the replicated data chunks stored in the respective storage node to form a data object, wherein data objects thereby formed collectively represent a given data volume; and
   performing respective parallel write operations from given ones of the storage nodes of the first data storage system to given ones of storage nodes of a second data storage system of the network distributed storage system environment to store each of the data objects in separate storage nodes of the second data storage system, the first data storage system being a replicated networked distributed storage system, and the second data storage system being an erasure coded networked distributed storage system; and
   wherein the steps of the method are performed by at least one processing device.

2. The method of claim 1, further comprising maintaining a mapping between the data chunks and the data objects formed therefrom.

3. The method of claim 2, wherein metadata associated with the mapping for a given data chunk comprises a data object identifier, an offset parameter, and a length parameter.

4. The method of claim 1, further comprising performing a read operation for at least a portion of the data objects stored in the second data storage system.

5. The method of claim 1, wherein the controller controls the accessing, aggregating and storing steps.

6. An article of manufacture comprising a non-transitory processor-readable storage medium having encoded therein executable code of one or more software programs, wherein the one or more software programs when executed by the at least one processing device implement the steps of:
   accessing, in response to a request received from an application program, a set of data chunks stored in a first data storage system of a network distributed storage system environment, the set of data chunks comprising one or more original data chunks and one or more replicated data chunks respectively corresponding to the one or more original data chunks, wherein a given original data chunk and the corresponding replicated data chunk are stored in separate storage nodes of the first data storage system, the first data storage system being a replicated networked distributed storage system, wherein the request is received by a controller in communication with the first data storage system;
   for each of at least a subset of storage nodes of the first data storage system, aggregating two or more of the original data chunks and the replicated data chunks stored in the respective storage node to form a data object, wherein data objects thereby formed collectively represent a given data volume; and
   performing respective parallel write operations from given ones of the storage nodes of the first data storage system to given ones of storage nodes of a second data storage system of the network distributed storage system environment to store each of the data objects in separate storage nodes of the second data storage system, the second data storage system being an erasure coded networked distributed storage system.

7. An apparatus to improve data archiving within a network distributed storage system environment, comprising:
   a memory; and
   at least one processor operatively coupled to the memory and configured to:
   access, in response to a request received from an application program, a set of data chunks stored in a first data storage system of the network distributed storage system environment, the set of data chunks comprising one or more original data chunks and one or more replicated data chunks respectively corresponding to the one or more original data chunks, wherein a given original data chunk and the corresponding replicated data chunk are stored in separate storage nodes of the first data storage system, the first data storage system being a replicated networked distributed storage system, wherein the request is received by a controller in communication with the first data storage system;
   for each of at least a subset of storage nodes of the first data storage system, aggregate two or more of the original data chunks and the replicated data chunks stored in the respective storage node to form a data object, wherein data objects thereby formed collectively represent a given data volume; and
   perform respective parallel write operations from given ones of the storage nodes of the first data storage system to given ones of storage nodes of a second data storage system of the network distributed storage system environment to cause each of the data objects to be stored in separate storage nodes of the second data storage system, the second data storage system being an erasure coded networked distributed storage system.

8. A method for improving data archiving within a network distributed storage environment, comprising:

identifying at least one data extent stored in a block data storage system of the network distributed storage system environment that is accessed relatively infrequently as compared to other data extents stored in the block data storage system;

mapping the identified data extent into a data object; and storing the data object in an object data storage system of the network distributed storage system environment, wherein the block data storage system represents a primary storage tier within a replicated distributed storage system, and the object data storage system represents a secondary storage tier within an erasure coded storage system;

wherein the storing step is performed by respective parallel write operations from the primary storage tier to the secondary storage tier;

wherein the steps of the method are performed by at least one processing device.

9. The method of claim 8, wherein the data object comprises the data associated with the data extent and metadata.

10. The method of claim 9, wherein the metadata comprises one or more of an identifier of a block with which the identified data extent is associated, an address and a length associated with the identified data extent, and an identifier of the data object.

11. The method of claim 8, wherein the step of identifying at least one data extent stored in a block data storage system that is accessed relatively infrequently further comprises collecting and analyzing input/output statistics over a specified time window for extents in the block data storage system.

12. The method of claim 8, further comprising inserting a reference parameter in the block data storage system in place of the identified data extent, wherein the reference parameter points to the data object to which the identified data extent is mapped.

13. The method of claim 12, further comprising the data object in the object data storage system receiving an input/output request from an application program through the block data storage system via the reference parameter inserted therein.

14. The method of claim 8, wherein the object data storage system is a dispersed object data storage system.

15. An article of manufacture comprising a non-transitory processor-readable storage medium having encoded therein executable code of one or more software programs, wherein the one or more software programs when executed by the at least one processing device implement the steps of:

identifying at least one data extent stored in a block data storage system of a network distributed storage system environment that is accessed relatively infrequently as compared to other data extents stored in the block data storage system;

mapping the identified data extent into a data object; and storing the data object in an object data storage system of the network distributed storage system environment, wherein the block data storage system represents a primary storage tier within a replicated distributed storage system, and the object data storage system represents a secondary storage tier within an erasure coded storage system;

wherein the storing step is performed by respective parallel write operations from the primary storage tier to the secondary storage tier.

16. The apparatus of claim 7, wherein the at least one processor is further configured to maintain a mapping between the data chunks and the data objects formed therefrom.

17. The article of manufacture of claim 6, wherein the one or more software programs when executed by the at least one processing device further implement the step of maintaining a mapping between the data chunks and the data objects formed therefrom.

18. The article of manufacture of claim 15, wherein metadata associated with mapping the identified data extent comprises a data object identifier, an offset parameter, and a length parameter.

* * * * *